(12) United States Patent
Ophardt

(10) Patent No.: US 7,530,477 B2
(45) Date of Patent: *May 12, 2009

(54) COMBINATION LIQUID DISPENSER AND ELECTROCHEMICAL CELL

(75) Inventor: Heiner Ophardt, Vineland (CA)

(73) Assignee: Gotohti.com Inc., Beamsville, Ontario (CA)

( * ) Notice: Subject to any disclaimer, the term of this patent is extended or adjusted under 35 U.S.C. 154(b) by 727 days.

This patent is subject to a terminal disclaimer.

(21) Appl. No.: 10/976,906

(22) Filed: Nov. 1, 2004

(65) Prior Publication Data

US 2005/0064281 A1 Mar. 24, 2005

Related U.S. Application Data

(63) Continuation of application No. 10/051,750, filed on Jan. 18, 2002, now Pat. No. 6,875,539.

(51) Int. Cl.
*B67D 5/44* (2006.01)
*H01M 8/00* (2006.01)

(52) U.S. Cl. .................. 222/372; 222/251; 429/12; 429/22

(58) Field of Classification Search .................. None
See application file for complete search history.

(56) References Cited

U.S. PATENT DOCUMENTS

| | | | |
|---|---|---|---|
| 4,402,817 A | 9/1983 | Maget | |
| 4,522,698 A | 6/1985 | Maget | |
| 4,886,514 A | 12/1989 | Maget | |
| 5,090,963 A | 2/1992 | Gross | |
| 5,132,193 A | 7/1992 | Reddy et al. | |
| 5,154,317 A | 10/1992 | Roppolo, III | |
| 5,290,240 A | 3/1994 | Horres, Jr. | |
| 5,316,452 A | 5/1994 | Bogen | |
| 5,364,711 A | 11/1994 | Yamada et al. | |
| 5,368,571 A | 11/1994 | Horres, Jr. | |
| 5,432,023 A | 7/1995 | Yamada et al. | |
| 5,593,552 A | 1/1997 | Joshi et al. | |

(Continued)

FOREIGN PATENT DOCUMENTS

JP 2001-247200 * 9/2001

OTHER PUBLICATIONS

Article—"Cell Phone Runs on Alcohol"—Manhattan Scientifics Inc.—by Reuters—Dec. 31, 1998; Article—"Manhattan Scientifics To Develop Fuel Cell Powered Vacuum Cleaner Prototype With Electrolux and Lunar Design"—Jan. 24, 2001.

(Continued)

*Primary Examiner*—Jonathan Crepeau
*Assistant Examiner*—Tony Chuo
(74) *Attorney, Agent, or Firm*—Riches, McKenzie & Herbert LLP

(57) ABSTRACT

In combination, a fluid dispenser and an electrochemical cell to produce electric energy by chemical conversion of the fluid to be dispensed. The electrical energy produced is preferably used to operate a device associated with the dispensing of the fluid as, for example, in operation of an electric pump-to-pump fluid from the reservoir. The fluid preferably is dispensed for use after dispensing in some other purpose than as a source for electrochemical energy to dispense fluid from the reservoir. For example, preferred fluid containing alcohol compounds are for use in cleaning and disinfecting.

19 Claims, 7 Drawing Sheets

U.S. PATENT DOCUMENTS

| | | | |
|---|---|---|---|
| 5,601,936 A * | 2/1997 | Dudfield et al. | 429/13 |
| 5,645,114 A | 7/1997 | Bogen | |
| 5,645,404 A | 7/1997 | Zelenak | |
| 5,652,043 A | 7/1997 | Nitzan | |
| 5,759,712 A | 6/1998 | Hockaday | |
| 5,811,204 A | 9/1998 | Nitzan | |
| 5,836,482 A | 11/1998 | Ophardt et al. | |
| 5,891,097 A | 4/1999 | Saito et al. | |
| 5,897,522 A | 4/1999 | Nitzan | |
| 5,947,167 A | 9/1999 | Bogen | |
| 5,997,821 A | 12/1999 | Joshi | |
| 6,092,695 A | 7/2000 | Loeffler | |
| 6,326,097 B1 | 12/2001 | Hockaday | |
| 6,648,085 B2 * | 11/2003 | Nagura et al. | 180/65.1 |
| 2003/0129464 A1 * | 7/2003 | Becerra et al. | 429/25 |

OTHER PUBLICATIONS

Article—"Ethanol Fuel Cells Take Aim At Portables' Power"—Charles J. Murray, EE Times, Jul. 17, 2001.
Website Pages—MEDIS Technologies: Clean Energy for the 21st Century—Products—Oct. 7, 2001.
Website Pages—More Energy Ltd.
Website Pages—Power Paper—Dec. 27, 2000.

* cited by examiner

COMBINATION LIQUID DISPENSER AND ELECTROCHEMICAL CELL

RELATED APPLICATION

This application is a continuation of U.S. patent application Ser. No. 10/051,750 filed Jan. 18, 2002, issued as U.S. Pat. No. 6,875,539.

SCOPE OF THE INVENTION

This invention relates to a combination of a fluid dispenser and an electrochemical cell and more particularly to a fluid dispenser, which is electrically powered by electricity generated in an electrochemical cell by electrolytic conversion of the fuel being dispensed.

BACKGROUND OF THE INVENTION

Fluid dispensers are known which dispense fluid by the use of dispensing apparatuses using electricity to dispense the fluid as, for example, by operation of an electric pump to pump the fluid from a reservoir, by control and/or metering of the fluid being dispersed and by the use of sensors to sense proximity, for example, of a user's hand to a cleaning fluid dispenser. An example of an electrically powered fuel dispenser with control circuits and proximity sensors are disclosed in the applicant's U.S. Pat. No. 5,836,482 which shows, in particular, a disposable flexible plastic bag to contain liquid hand soap and carrying two conventional batteries which, when the bag is coupled to a dispenser provides power to dispense soap from the bag by means of an electric pump. Electric proximity sensors may control operation of the pump.

Known fluid dispensers, which are battery operated, suffer the disadvantages that separate batteries must be provided. Convention batteries need to be replaced periodically and are difficult to recycle. Disposable fluid reservoirs are known which are made of recyclable plastic materials, however, known batteries are not made of easily recyclable materials and must be separately recycled from the reservoirs.

Fuel cells for the creation of electrical energy by the conversion of alcohol compounds, such as, ethanol are known as are techniques for manufacturing such fuel cells in the mass production manner as on the plastic film.

Direct alcohol fuel cells are taught in U.S. Pat. No. 5,132,193 to Ready, issued Jul. 21, 1992 which teaches generation of electricity in a small compact alcohol fuelled fuel cell electric power plant in which poisoning by reaction intermediates is avoided or minimized. As alcohol fuels, lower primary alcohols are preferred particularly methanol and ethanol with other lower primary alcohols such as 1-propanol, 1-butanol and n-amyl alcohol also operative.

Miniature fuel cells that run on ethanol and adapted to run electronics are disclosed in U.S. Pat. No. 5,364,711 to Wamada, issued Nov. 15, 1994 and U.S. Pat. No. 5,432,023 to Wamada, issued Jul. 11, 1995. These patents teach the advantages of using miniature fuel cells and a number of techniques to build fuel cells. U.S. Pat. No. 5,759,712 to Hockaday describes packaging of a fuel cell on a general hybrid system which may be comprised of fuel cell and other energy sources, such as a battery.

Miniature liquid fuel cells are known as discussed in U.S. Pat. No. 6,326,097 to Hockaday, issued Dec. 4, 2001. Hockaday is directed to the coupling of such fuel cells to portable electric devices, such as, cell phones. Hockaday teaches micro fuel cell arrays which may be mass-produced on a plastic film in a reel-to-reel process.

Electrochemical cells are known which are relatively inexpensive. Closed electrochemical cells suffer a disadvantage that typically gases which may be produced at one of the electrodes reduce the life of the cell and/or excessive accumulation of the gases are not provided or come to render the cell unusable. Open cell electrochemical batteries and fuel cells are known, however, they suffered the disadvantage that they consume fuel and fuel must be replaced.

SUMMARY OF THE INVENTION

To at least partially overcome the disadvantages of previously known devices, the present invention provides in combination, a fluid dispenser using electricity to dispense fluid from a reservoir and an electrochemical cell to produce the electric power, in which the electric energy is derived from chemical conversion of the fluid to be dispensed. The fluid is to be dispensed for use in a purpose other than providing the electrical energy for dispensing. Thus, for example, the fuel after dispensing is for use as a cleaning or a disinfectant solution. The fluid contains suitable compounds, such as, alcohol compounds, which can be chemically converted into electrochemical cells to produce current flow between the electrodes.

It is an object of the present invention to provide a fluid dispenser in combination with an electrochemical cell, which chemically converts a component of the fluid to generate electrical current to dispense the fluid.

It is another object of the present invention to provide a fluid dispenser with a disposable fluid-containing reservoir, containing a fluid which can be chemically converted to produce electrical energy to drive a device associated with the dispensing mechanism, and in which the fluid in the fluid-containing reservoir provides sufficient energy to dispense substantially all the fluid from the reservoir.

Another object is to provide fluid for dispensing from a reservoir which is capable of electrical conversation to produce electricity in an electrochemical cell, preferably, as a fuel in a fuel cell, which fluid after being at least partially chemically converted continues to have utility after being converted and dispensed, for example, as a disinfectant or cleaner.

Another object is to provide a fluid dispenser in communication with a fuel cell to generate electricity using the fluid to be dispensed as fuel.

Accordingly, in one aspect, the present invention provides a fluid dispenser and an electrochemical cell, the fluid dispenser comprising:

a reservoir containing a fluid to be dispensed and a dispensing mechanism requiring an electric current to perform a function associated with dispensing fluid from the reservoir, a fuel cell comprising an electrolyte and two electrodes namely an anode and a cathode, the anode and cathode separated from each other with the electrolyte between the anode and cathode, fuel for the cell comprising fluid from the reservoir in communication with a first of the electrodes, the anode and cathode electrically coupled across the dispensing mechanism to provide current flow through the dispensing mechanism by chemical conversion of the fluid at the first of the electrodes.

The present invention provides in combination, a fluid dispenser and an electrochemical cell to produce electric energy by chemical conversion of the fluid to be dispensed. The electrical energy produced is preferably used to operate a device associated with the dispensing of the fluid as, for example, in operation of an electric pump-to-pump fluid from the reservoir. The fluid preferably is dispensed for use after dispensing in some other purpose than as a source for electrochemical energy to dispense fluid from the reservoir. For example, preferred fluid containing alcohol compounds are for use in cleaning and disinfecting.

The electrochemical cell preferably has an electrolyte and two electrodes which are separated from each other with the electrolyte between them. Current flows between the electrodes as a result of chemical conversion of the fluid from the reservoir. Such current flow is directly or indirectly used to power an electric load associated with achieving the object of dispensing fluid from the reservoir.

In one preferred embodiment, the electrodes are electrically coupled across the dispensing mechanism to provide current flow directly to the dispensing mechanism with chemical conversion of the fluid at one of the electrodes.

In another embodiment, a separate rechargeable electricity storage device such as a battery may be provided as part of the dispensing mechanism and electrical energy from chemical conversion of the fluid may be used to charge the storage device which storage device may be used to drive the remainder of the dispensing mechanism.

The dispensing mechanism may preferably comprise an electric pump, preferably a direct current electric pump which is operational under low current voltage and/or power conditions to dispense fluid from the reservoir. The dispensing mechanism may comprise a control mechanism with circuitry to control, monitor, time and/or meter dispensing and/or operation of the pump. For example, sensors to sense a user's hand in a touch free hand soap dispensing apparatus may comprise the dispensing mechanism. Alternatively, the energy created by the fluid could be a measure of the time the fluid has been in the reservoir to indicate shelf life or an indication as to the amount of fluid dispensed.

The electrochemical cell may comprise a fuel cell or an open or a closed battery. When the cell is a fuel cell, fluid from the reservoir comprises fuel for the fuel cell with the fluid in communication with a first of the electrodes, referred to as the fuel electrode. The other second electrode, referred to as a non-fuel electrode is preferably in communication with atmospheric air which inherently contains oxygen. The fuel cell provides current flow between the electrodes preferably by chemical conversion of the fluid at the fuel electrode and the consumption of the oxygen at the non-fuel electrode to produce water as a non-fuel electrode. Preferred fluids for fuel cell include those containing alcohol compound, most preferably, ethanol. Such fluids are adapted for use as a fuel in a fuel cell and, as well, are useful for other purposes such as, as cleaners and disinfectants as, for hygienic and medical use, as beverages, as window cleaning agents, as deicers and the like.

The fuel electrode may be in communication with the fluid either before or after the fluid passes through a dispensing pump. With the fuel electrode in communication with the fluid before the fluid passes through a pump, as at the bottom of a reservoir or being located below a reservoir, the fuel electrode may be engaged by the fluid at all times that the reservoir contains at least some fluid.

In a fuel cell, the fuel electrode is preferably in communication with the reservoir and the electrolyte between the fuel electrode and the non-fuel electrode preferably provides a barrier between fluid in the reservoir and the atmosphere which resists movement of fluid components therethrough, and is preferably impermeable to the compounds comprising the fluid. Preferably, the reservoir contains the fluid and the fuel electrode in a sealed container but for an outlet via which fluid may be dispensed, more preferably with the sealed container being provided by a collapsible container or a bag. Having a sealed containment vessel is particularly preferred when the fluid contains compounds, which are volatile and would evaporate under normal temperatures.

When the cell does not require the consumption of oxygen or other matter at the non-fuel electrode and, therefore, functions like a battery, simultaneously with the conversion of the fluid at the fuel electrode, gases may be produced at the non-fuel electrode. These gases may be contained within the same collapsible and expandable sealed reservoir which contains the fluid. Gas pressure is created in the expandable sealed reservoir containing the fluid which may assist in expelling liquid from the reservoir. A pressure release valve may be provided to vent gas under excessive pressure. The gases may alternatively be contained within an expandable container which may be a separate expandable compartment within a collapsible and expandable sealed reservoir for the fluid.

In another simple arrangement, two electrodes may be provided within the fluid spaced apart by the fluid, with the fluid serving both as the fuel and as the electrolyte.

BRIEF DESCRIPTION OF THE DRAWINGS

Further aspects and advantages of the present invention will appear from the following description taken together with the accompanying drawings, in which.

DETAILED DESCRIPTION OF THE DRAWINGS

Figure 1:
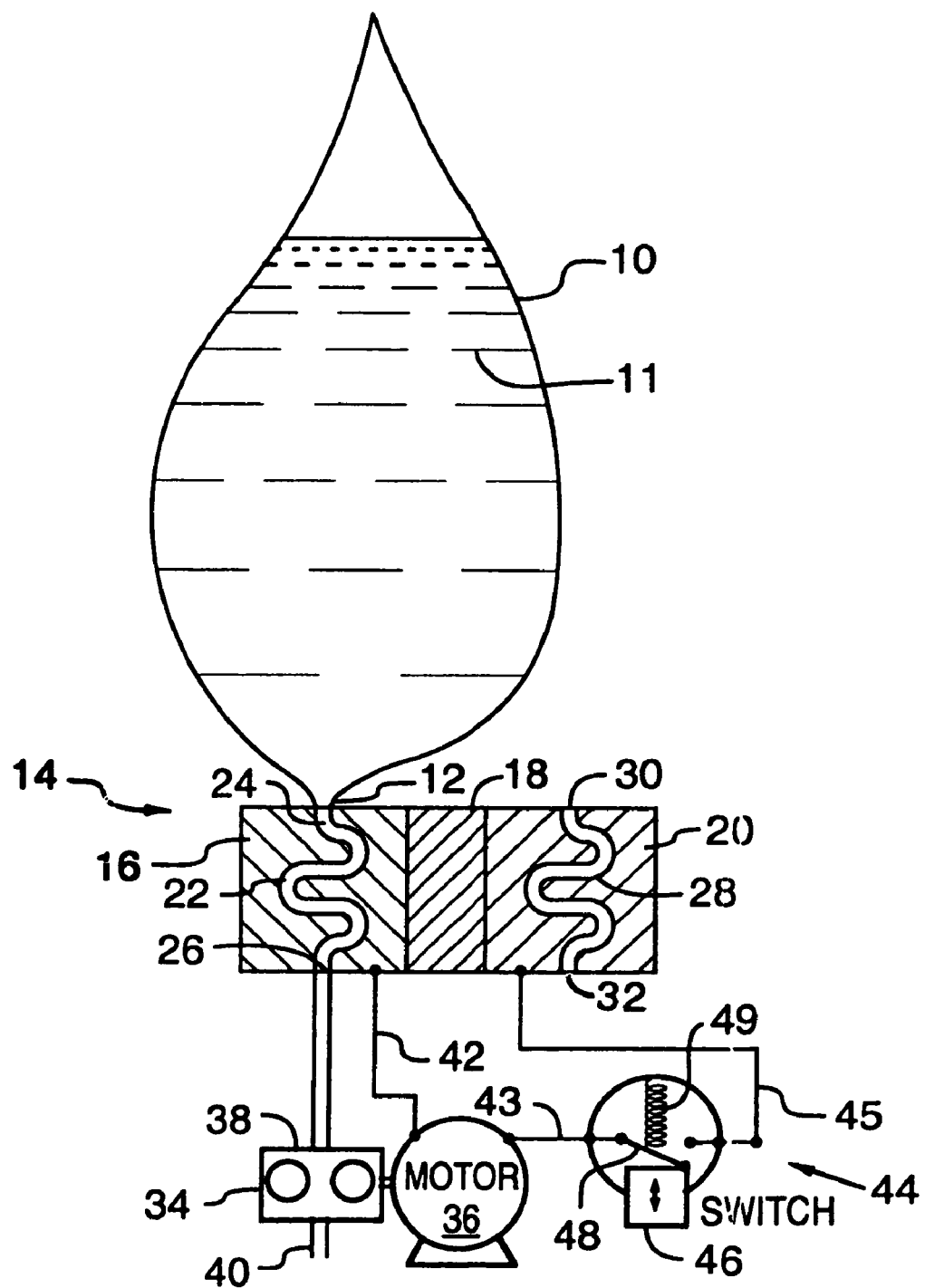
FIG. 1 is a schematic view of a dispensing apparatus in accordance with a first embodiment of this invention.

Reference is made first to FIG. 1 which is a schematic view of a combined dispenser and fuel cell in accordance with a first embodiment of the invention. The fluid dispenser comprises a collapsible, sealed reservoir 10 open at an outlet 12. The reservoir is mounted so that under gravity the fluid 11 within the reservoir flows through the outlet 12. The reservoir 10 has flexible walls, preferably made of flexible recyclable plastic sheet material.

The fuel cell 14 comprises a fuel electrode 16, an electrolyte 18 and a non-fuel electrode 20. A fluid passageway 22 extends through the fuel electrode 16 so as to place fluid from the reservoir 10 into communication and contact with the fuel electrode 16. The fluid passageway 22 extends from an inlet 24 to an outlet 26. With the outlet 12 of the reservoir 10 connected to the passageway inlet 24, fluid passes through the fluid passageway 22 to the passageway outlet 26.

A non-fuel passageway 28 extends through the non-fuel electrode 20 to place atmospheric air containing oxygen into communication with the non-fuel electrode and permit water created at the non-fuel electrode to exit the non-fuel passageway 28. The non-fuel passageway extends from an inlet 30 to an outlet 32. Air may enter the non-fuel passageway 28 via inlet 30 and, if necessary, water may exit the non-fuel passageway 28 under the influence of gravity via outlet 32.

A dispensing mechanism is provided comprising a mechanical impeller pump 34 having impellers, not shown, within a casing with the impellers being coupled for rotation by an electric pump motor 36. The pump 34 has an inlet 38 and an outlet 40. The pump inlet 38 is connected to the outlet 26 of the fluid passageway 22.

When the pump 34 is operated by the pump motor 36, fluid is forced out of the pump outlet 40, which fluid has been drawn from the reservoir 10 through the fluid passageway 22.

FIG. 1 schematically shows a simple electrical circuit including a wire 42 connecting the fuel electrode 16 to one terminal on the motor 36, a wire 43 connecting the other terminal on the motor 36 to one terminal on a switch 44 and a wire 45 connecting the other terminal on the switch 44 to the non-fuel electrode 20. The switch 44 is schematically shown as including a sliding button 46 biased with the switch contact 48 by a spring 49 to an open position. On manually closing the switch by depressing the button 46, the two electrodes are electrically connected across the motor 36 and the fuel cell is placed into an operative position whereby current flow between the electrodes may drive the motor 36 and dispense fluid out of the reservoir.

In a known manner, the fuel cell whether an acid electrolyte fuel cell or an alkaline electrolyte fuel cell preferably chemically converts components in the fluid at the fuel electrode 16 at the same time that oxygen from the air is consumed at the non-fuel electrode, typically to produce water.

In one preferred embodiment, the fuel cell is an acid electrolyte fuel cell with the fuel being chemically converted to release hydrogen ions which pass through the electrolyte to the non-fuel electrode which then combined with oxygen to form water at the non-fuel electrode and by which electrons flow between the non-fuel electrode and the fuel electrode. However, the fuel cell could also function as an alkaline electrolytic cell with hydroxy ions to pass through the electrolyte.

Figure 2:
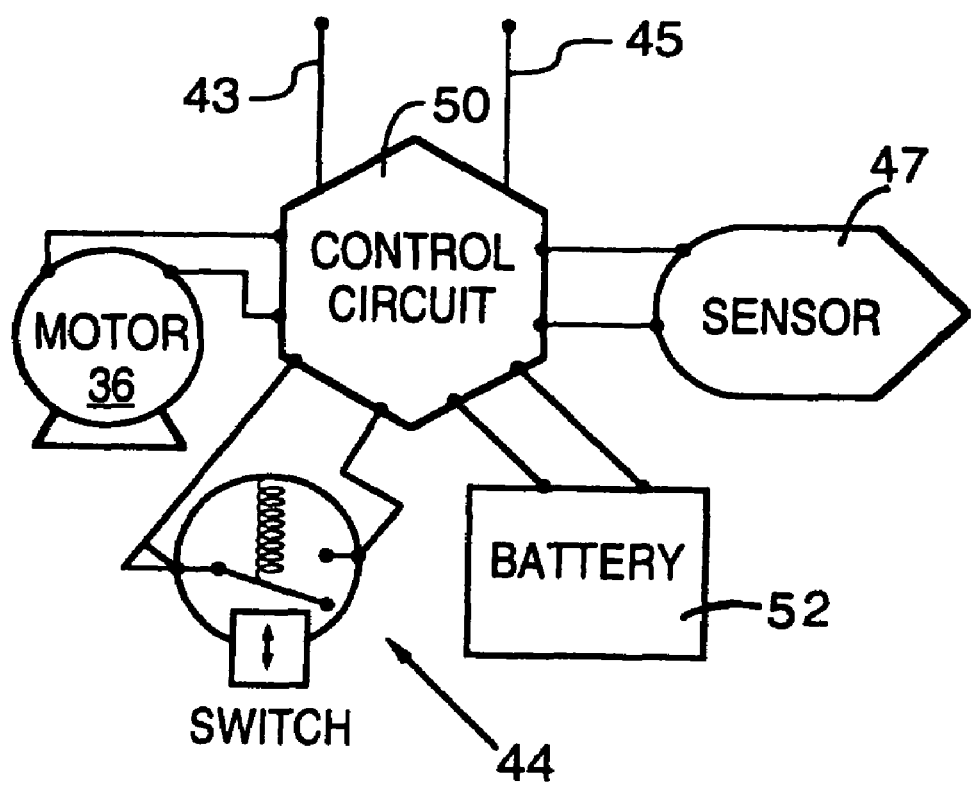
FIG. 2 is a schematic diagram of an enhanced control circuit for use with the dispensing apparatus of FIG. 1.

FIG. 2 is a schematic view of a more complex dispensing mechanism for a substitution for that in FIG. 1. FIG. 2 shows the leads 43 and 45 from the two electrodes being connected to terminals on a central circuit 50 which is suitably electrically connected to the motor 36, to the switch 44 and, as well, through a sensor 47 and a battery 52. The control circuit 50 may be structured to accomplish many different objectives. For example, the control circuit may transfer electrical energy to the battery to store electric power generated by the cell. The control circuit may control power flow from the battery to operate the pump motor. The control circuit may control operation of the pump motor when the control is activated as, for example, to merely operate the pump for a short interval to dispense a selected quantity of fluid. The switch may be a manual switch controlled by the operator or a proximity sensor requiring electrical power to operate sensors, such as, infrared motion or proximity sensors. The control circuit may have sensors to recognize input codes or a user's fingerprints and timers, recorders and the like, any of which may be operated by electric power from the fuel cell. The control circuit may monitor the time the reservoir is connected to the fuel cell or the quantity of electric power produced as to estimate the volume of fluid dispensed.

Figure 3:
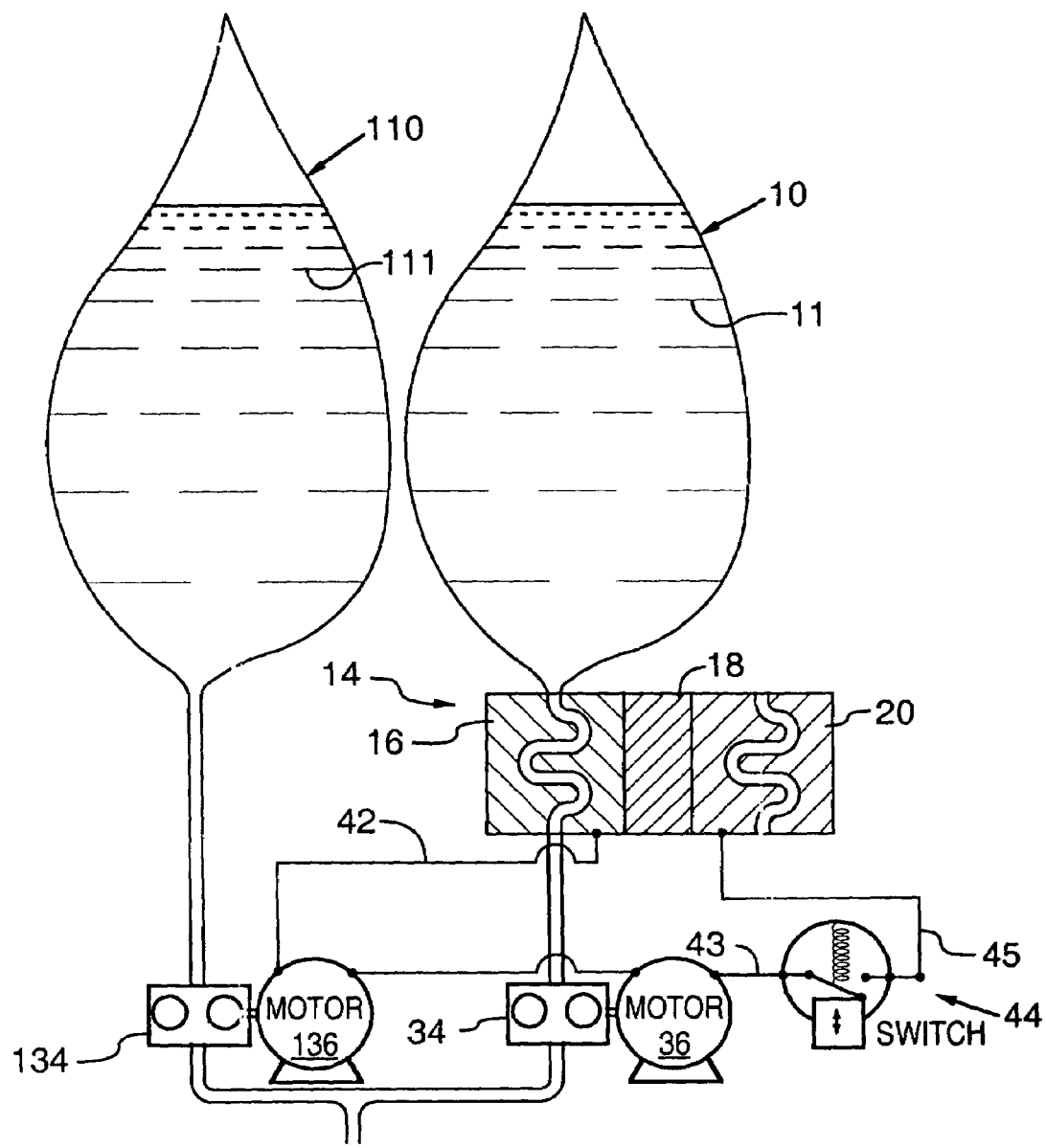
FIG. 3 is a schematic view of a dispensing apparatus incorporating an apparatus identical to that of FIG. 1 together with a secondary reservoir.

Reference is made to FIG. 3 which illustrates the dispenser in accordance with the present invention which is identical to the device as FIG. 1, however, includes in addition to the first reservoir 10 and first pump 34 driven by a first motor 36, a second reservoir 110 and a second pump 134 driven by a second motor 136. As seen, the second motor 136 is electrically connected in series with the first motor by circuitry including wire 54 connecting the second motor 136 in a manner to permit it to also be driven when the switch 44 is closed. Of course, the second motor 136 could be arranged in parallel to the first motor.

The arrangement of FIG. 3 permits dispensing of both a first fluid 11 within reservoir 10 which is capable for use as a fuel and a second fluid 41 within the second reservoir 110 which need not be capable for use as a fluid. The output from both pumps 34 and 134 are shown as joined at a common outlet 62 and, preferably, in which the fluids 11 and 111 may be mixed. The operation and/or sizing of the pumps 34 and 134 may be selected and/or controlled to dispense desired proportions of the fluids 11 and 111. It is to be appreciated that while FIG. 3 shows the use of two reservoirs, two, three or more reservoirs may have their outputs link as shown in FIG. 3 and fuel cells may be provided on one or some or all of the reservoirs in the manner in which they have been provided for the reservoir 10.

Figure 4:
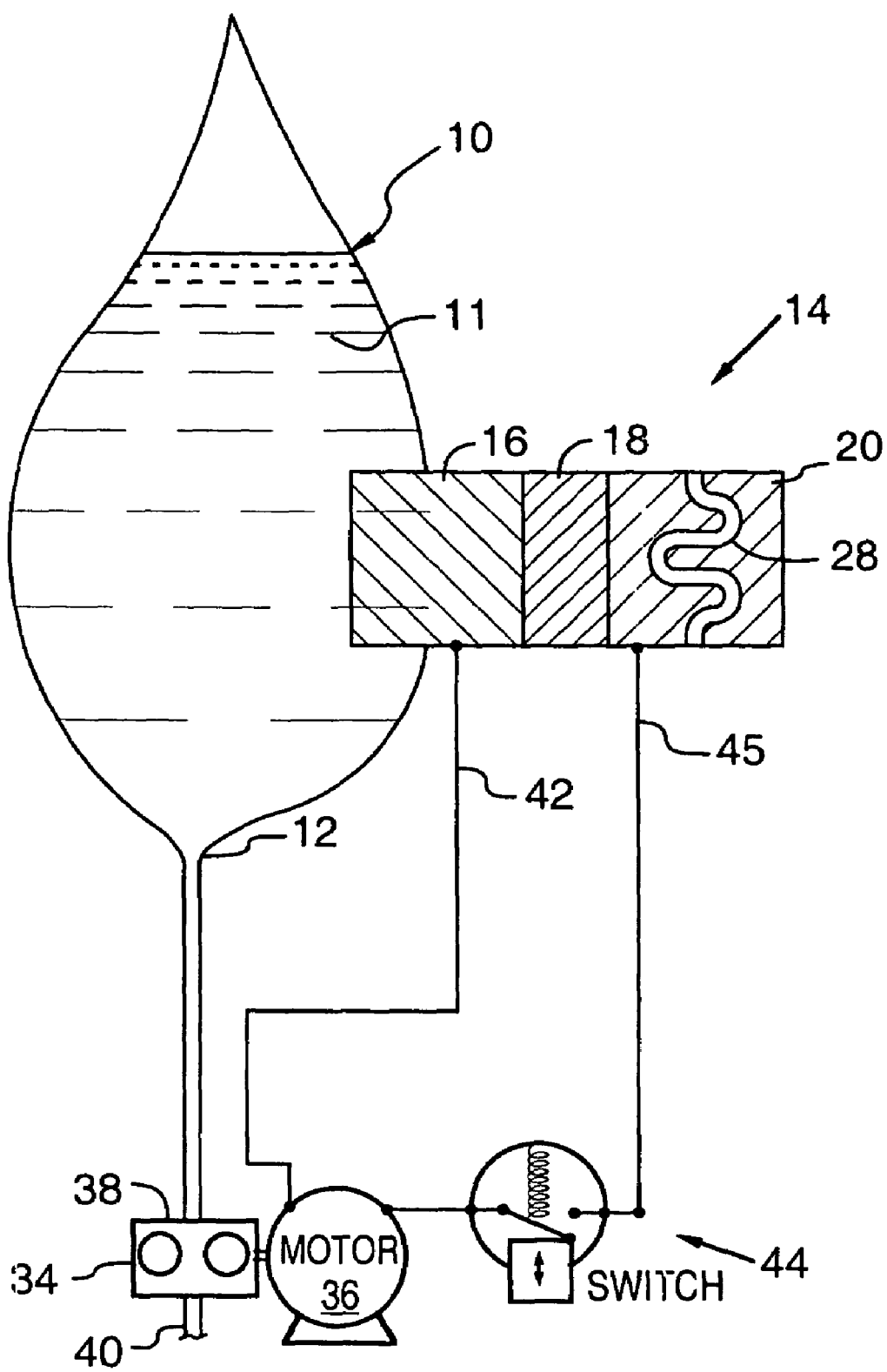
FIG. 4 is a schematic view of a dispensing apparatus in accordance with a second embodiment of the present invention.

Reference is made to FIG. 4 which schematically shows an arrangement in which the fuel electrode 16 is in communication with the fluid in the reservoir 10 through a sidewall 56 of the reservoir. The fuel cell 14 may extend through an opening in the sidewall of the reservoir as, for example, removably sealed to the sidewall about the perimeter of the fuel electrode. Alternatively, the sidewall of the reservoir wall may be formed integrally to carry at least the fuel electrode.

In the embodiment shown in FIG. 1, the reservoir 10 is preferably a replaceable reservoir such that when the fluid in the reservoir is exhausted, the reservoir 10 may be uncoupled from the fuel cell 14 and a new reservoir which is filled with fluid may be connected. Preferably, the reservoir is formed entirely from an easily recyclable plastic material. In the case of the embodiment of FIG. 3, it is possible that the reservoir may have two openings, the first being its outlet 12 by which the fluid is dispensed from the reservoir and the second being an opening adapted to sealably, releasably engage with the fuel cell, for example, where the reservoir is to be attachable and removable from the fuel electrode such that the reservoir may be disposed independent from the fuel cell.

Figure 5:
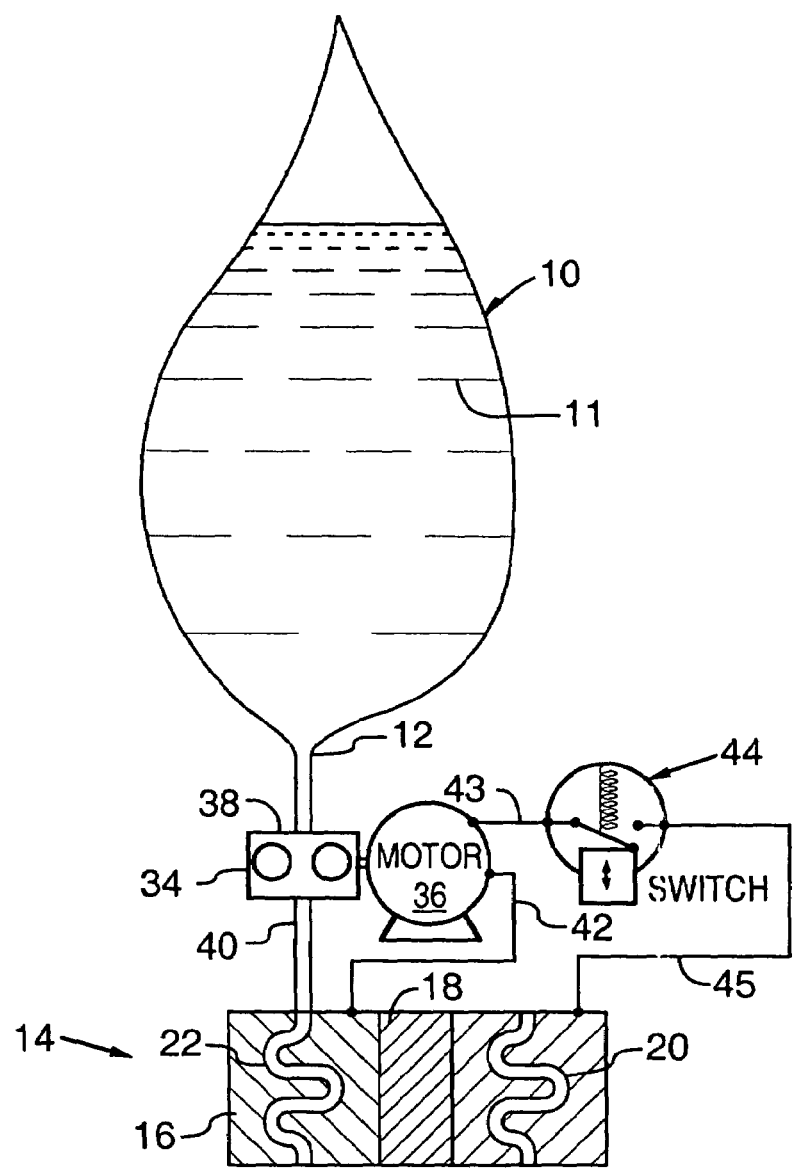
FIG. 5 is a schematic view of a dispensing apparatus in accordance with a third embodiment of the present invention.
Figure 6:
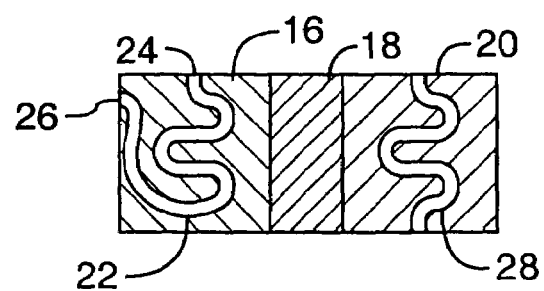
FIG. 6 is a schematic view of a fuel cell for use to replace the fuel cell in the embodiment of FIG. 4.

As contrasted with the embodiments of FIGS. 1, 3 and 4 in which the fuel cell 14 is upstream of the pump 34, FIG. 5 shows an embodiment in which the fuel cell 14 is downstream of the pump 34 with fluid to pass through the fluid passageway 22 in the fuel electrode 16 after exiting the pump outlet 40. In the configuration of FIG. 5, it can be advantageous that the passageway outlet 26 provide resistance sufficient to prevent flow of fluid out of the outlet merely due to gravity. The outlet could have a resistance valve therein or a reduced size orifice. Preferably, the passageway 22 may be maintained full of fluid with flow from the passageway effectively only when fluid is forced into the passageway by the pump. Alternatively, as seen in FIG. 6 which is identical to FIG. 5 but for the configuration of the fluid passageway 22, the passageway 22 may have its inlet and outlet located at relative heights so as to form a cavity which due to gravity maintains a small volume of fluid within the fuel passageway 22. The volume of fuel maintained within the cavity in the fuel electrolyte is preferably selected as sufficient to charge a battery or other electrical storage device with at least sufficient electrical energy to dispense a desired unit dose of the fluid.

One preferred fluid for use as fuel is a fluid containing alcohol compounds, most preferably, ethanol which is also known as ethyl alcohol.

Alcohol compounds may be selected from the group comprising a methyl alcohol (also known as methanol), ethyl alcohol, propyl alcohol, isopropyl alcohol (also known as isopropanol), butyl alcohol, isobutyl alcohol, sec-butyl alcohol, tert-butyl alcohol, 1-pentanol, 1-hexanol, ethylene glycol, propylene glycol, glycerol (also known as glycerine) and benzyl alcohol. Preferred such alcohol compounds may be those which are non-toxic and have lower flammability. Commercially available disinfectants and cleaners are known which comprise substantial portions of such alcohol compounds. For example, Gojo Industries of Akron, Ohio, has a product by the name "Purell" (trade name) instant hand sanitizer dry hands formula which is a liquid and includes about 62% of ethanol, in the range of about 10% of isopropanol and about 3% of glycerin. Other useful fluids as a fuel would be water/ethanol mixtures that are effectively equivalent to automotive windshield wiper fluids. Other fluids which would be useful include alcohol beverages for liquid consumption such as vodka which has a sufficiently high alcohol content.

Figure 7:
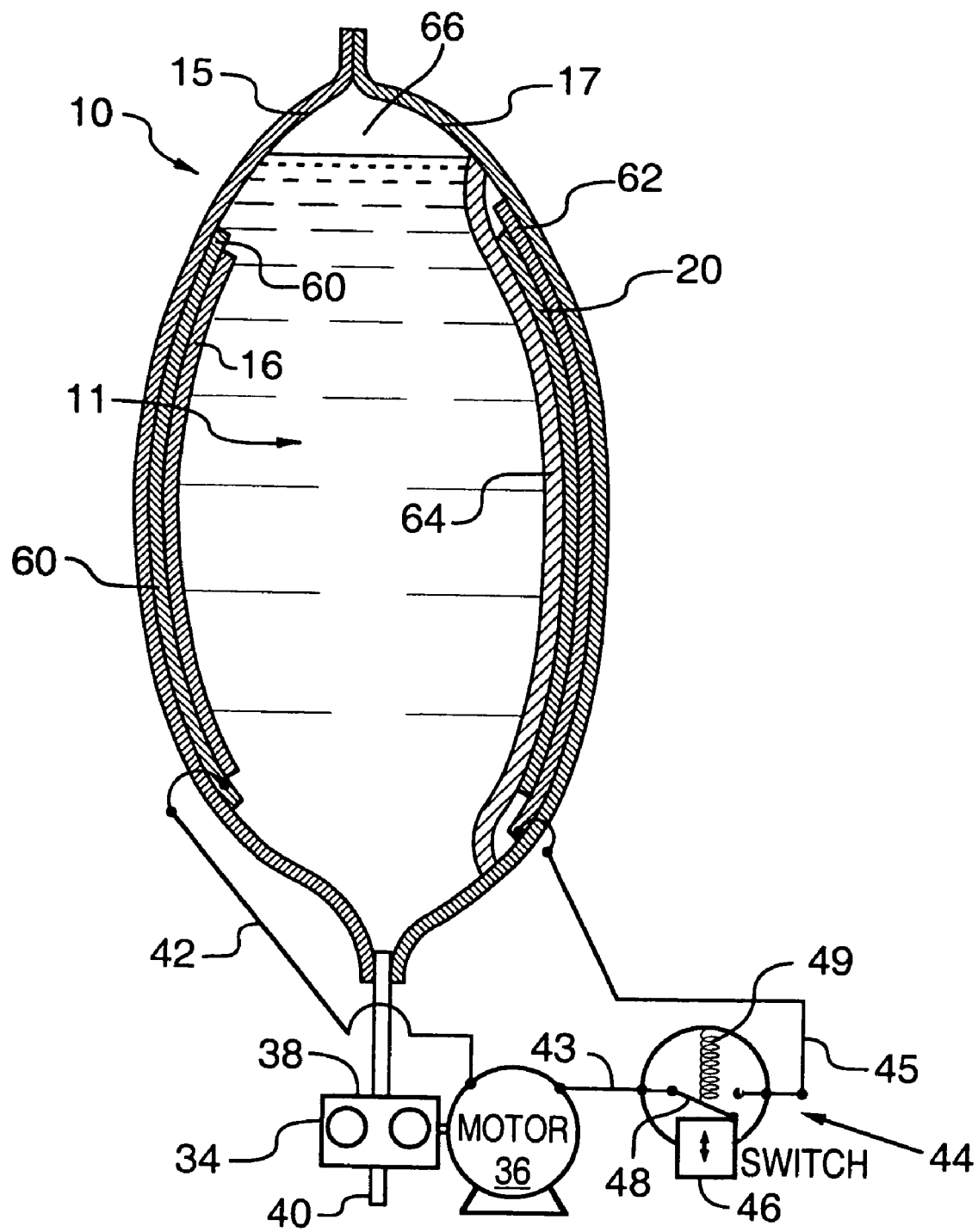
FIG. 7 is a schematic view of a dispensing apparatus in accordance with a fourth embodiment of the present invention.

Reference is made to FIG. 7 which shows another electrochemical cell in accordance with a fourth embodiment of the present invention. In the embodiment illustrated in FIG. 7, the reservoir 10 comprises a collapsible bag formed of sheet materials and open merely at its outlet 12. The reservoir 10 contains a first electrode 16 and a second electrode 20. The reservoir 10 is formed from plastic sheet material and has a first wall 15 and a second wall 17. A thin layer of conductive material 60 is carried on the inside surface of the first wall 15 and the first electrode 16 is carried as a thin preferably flexible layer on top of the conductive material 60. Similarly, on the second wall 17 of the bag, a thin layer 62 of conductive material is provided and the conductive layer 62 carries the second electrode 20 as a thin preferably flexible layer thereon.

A separating member 64 is provided overlying the second electrode 20 which separating member is porous and permits, without restriction, the fluid and gases to pass freely therethrough. The separating member 64 provides a physical barrier against the two electrodes 16 and 20 coming into physical contact with each other as is required insofar as the sidewalls of the bag are flexible and on collapsing it otherwise could be possible for the electrodes or their conductive layers or wires becoming to contact with each other.

A wire indicated as 42 extends from the first electrode 16 to one terminal on the motor 36 and another wire indicated as 45 extends from the second electrode 20 to one terminal of the switch 44. With the wire 42 connecting the other terminal on the motor 36 to the switch 44, a simple circuit is provided to operate the motor 36 and power the pump 34 to dispense the fluid from the reservoir.

In the embodiments shown in FIG. 7, the fluid 11 forms the electrolyte between the two electrodes 16 and 20. Chemical conversion of fluid arises at one of the electrodes and gases may be released at the other of the electrodes. Such gases may rise upwardly to the top of the reservoir as shown as 66. The bag forming the reservoir is preferably adapted to be collapsible and expandable. With the initial volume of the fluid placed in the bag to fill the bag, the bag may be sized to provide for adequate additional space, if necessary, to accommodate gases which may be produced. Creation of gas pressure within the reservoir 10 can assist in the expelling of fluid from the reservoir. As a modification of the device shown in FIG. 7, the spacing member could be replaced by a different member which serves as the equivalent of the electrolyte 18 in the other embodiments.

Figure 8:
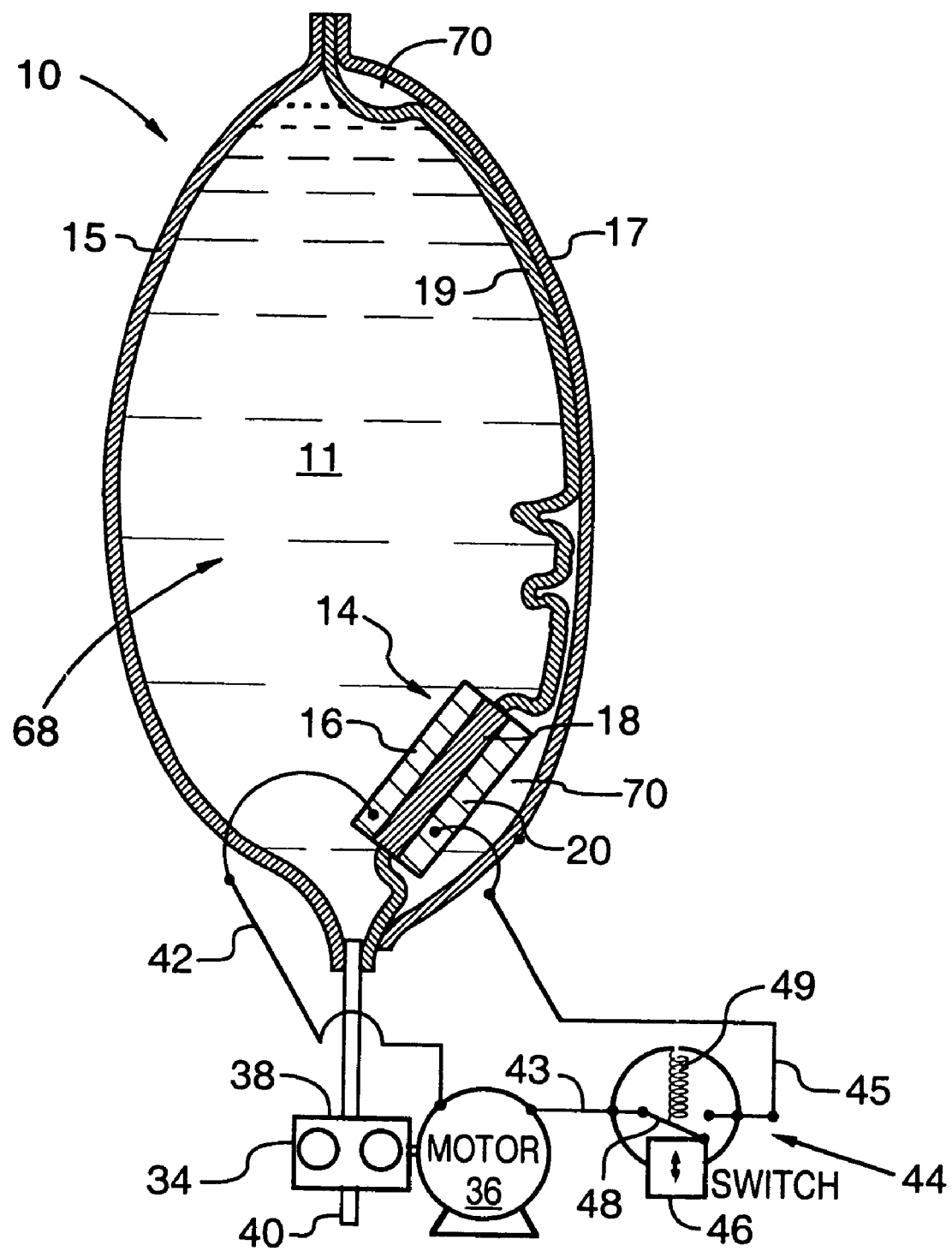
FIG. 8 is a schematic view of a dispensing apparatus in accordance with a fifth embodiment of the present invention.

Reference is made to FIG. 8 which shows a further embodiment of the present invention having similarity to the embodiment in FIG. 7. In the embodiment illustrated in FIG. 8, the flexible reservoir 10 is effectively formed with two compartments. The reservoir 10 has two flexible outside walls 15 and 17 and an interior dividing wall 19 also made of the fluid and gas impermeable flexible sheet material. The dividing wall 19 has a central opening therethrough within which there is sealably received a three layer fuel cell 14 comprising membranes comprising a first electrode 16, an electrolyte 18 and a second electrode 20. The dividing wall 19 and the first wall 15 form a first compartment 68 which is filled with fluid 11 such that the fluid 11 is in contact with the first electrode 16. The dividing wall 19 and the second wall 17 form a second compartment 70 open to the second electrode 20. The dividing wall 19 sealably engages one or more of the first electrode 16, electrolyte 18 and second electrode 20 so as to provide the first compartment 68 sealed from the second compartment 70. The first compartment 68 is initially filled with fluid and will collapse on the fluid being dispensed. The second compartment 70 is initially collapsed and is intended to receive and become expanded by the generation of gas at the second electrode 20. Separating the gas in the second compartment from the fluid 11 in the first compartment can be advantageous to ensure that the presence of gas in the fluid 11 does not impair the operation of the cell in producing electricity.

The embodiments as illustrated in FIGS. 7 and 8 are useful when the fluid 11 is volatile and needs to be maintained within a closed container. Insofar as the gas which may be produced at the second electrode may not be harmful and/or the quantities produced not substantial then any gas may merely be vented to the atmosphere. Optionally, a pressure release valve not shown may be provided so as to vent the gas if excess pressures may be developed.

Electrodes and conductive layers on sidewalls of the reservoirs may comprise relatively thin layers printed on substrates as, for example, in a manner in which similar to that taught in U.S. Pat. No. 5,897,522 to Nitzan, issued Apr. 27, 1999 and U.S. Pat. No. 6,326,097 to Hockaday, issued Dec. 4, 2001.

The preferred embodiments show a fluid dispenser to dispense liquids. The fluid dispensers in accordance with the present invention include dispensers in which the fluid is dispensed as a spray or as a foam. For example, by suitable selection of a pump and nozzle, fluid dispensed may be sprayed as in an atomized mist. Known spray dispensers include dispensers to dispense a spray of alcohol disinfectant onto a person's feet. Foam dispensers provide a foam as by mixing liquid to be dispensed with air.

Mops are known for cleaning floors which include reservoirs to dispense cleaner liquid onto the floor by spraying the cleaner liquid from a reservoir using a battery operated pump activated by a switch near the top of the handle of the mop. A combination pump and cell in accordance with the present invention could at least reduce the need for batteries in such a mop.

Systems are known in which a disinfectant liquid is added to a volume of water as, for example, for use in a dishwasher as a bath through which dishes are moved in one step of a dishwashing process. The amount of disinfectant to be added needs to be determined as a function of the volume of water in the bath. An electrochemical cell could be used in combination with a device to determine the amount of disinfectant to be dispensed as by measuring or assisting in measuring of the volume of water in the bath and/or dispensing a desired amount of disinfectant.

While this invention has been described with reference to preferred embodiments, many modifications and variations will now occur to persons skilled in the art. For a definition of the invention, reference is made to the following claims.

I claim:

1. A hand cleaning fluid dispenser comprising in combination,
   a fluid dispenser and an electrochemical cell,
   the fluid dispenser comprising a dispenser dispensing a hand cleaning fluid onto a person's hand,
   the dispenser including a reservoir containing the hand cleaning fluid to be dispensed and a dispensing mechanism requiring an electric current to dispense fluid from the reservoir onto a person's hand,
   the electrochemical cell comprising an electrolyte and two electrodes namely, an anode and a cathode, separated from each other with the electrolyte between the two electrodes,
   fuel for the cell comprising the hand cleaning fluid from the reservoir in communication with a first of the electrodes,
   the two electrodes electrically coupled across the dispensing mechanism to provide current flow through the dispensing mechanism by chemical conversion of the fluid at the first of the electrodes.

2. A dispenser as claimed in claim 1 wherein the electrochemical cell is a fuel cell.

3. A dispenser as claimed in claim 2 wherein:
   atmospheric air containing oxygen is in communication with a second of the electrodes,
   with chemical conversation of the fluid at the first electrode to provide current flow oxygen is consumed at the second electrode where water is produced.

4. A dispenser as claimed in claim 1 wherein the fluid comprises an alcohol compound which comprises the fuel for the cell.

5. A dispenser as claimed in claim 4 wherein the alcohol compound is selected from methyl alcohol, ethyl alcohol, propyl alcohol, isopropy alcohol, butyl alcohol, isobutyl alcohol, sec-butyl alcohol, tert-butyl alcohol, 1-pentanol, 1-hexanol, ethylene glycol, propylene glycol, glycerol and benzyl alcohol.

6. A dispenser as claimed in claim 5 wherein the alcohol compound is presenting at least 20% by volume of the fluid.

7. A dispenser as claimed in claim 1 wherein the dispensing mechanism comprises a pump for dispensing fluid from the reservoir, the pump having an inlet in communication with the reservoir and an outlet out of which fluid from the reservoir drawn into the pump inlet is dispensed.

8. A dispenser as claimed in claim 7 wherein the first electrode is in communication with the fluid upstream from the pump.

9. A dispenser as claimed in claim 7 wherein the first electrode is in communication with the fluid after the fluid has passed through the pump.

10. A dispenser as claimed in claim 1 wherein the first electrode is in communication with the fuel within the reservoir.

11. A dispenser as claimed in claim 7 wherein the reservoir has an outlet and a passageway for a passage of fluid from the outlet of the reservoir to the inlet of the pump,
    the passageway being in communication with the first electrode such that at least some fuel in the passageway contacts the first electrode.

12. A dispenser as claimed in claim 1 wherein the reservoir is a collapsible reservoir which reservoir collapses as fuel is dispensed.

13. A dispenser for hand cleaning fluid comprising in combination:
    a fluid dispenser and an electrochemical cell,
    the fluid dispenser comprising a reservoir containing the hand cleaning fluid to be dispensed and a dispensing mechanism requiring an electric current to dispense fluid from the reservoir onto a person's hand,
    the electrochemical cell comprising an electrolyte and two electrodes namely, an anode and a cathode, separated from each other with the electrolyte between the two electrodes,
    fuel for the cell comprising the hand cleaning fluid from the reservoir in communication with a first of the electrodes,
    the two electrodes electrically coupled across the dispensing mechanism to provide current flow through the dispensing mechanism by chemical conversion of the fluid at the first of the electrodes,
    wherein the two electrodes and the electrolyte are all disposed within the reservoir.

14. A dispenser as claimed in claim 13 wherein the reservoir has a liquid outlet at a lower portion of the reservoir and with chemical conversion of the fluid a gas as produced at the second electrode, wherein the gas rises through the fluid in the reservoir to an uppermost portion of the reservoir.

15. A dispenser as claimed in claim 14 wherein the reservoir is collapsible and expandable to accommodate increases and decreases m the volume within the reservoir occasioned by dispensing of the fluid and generation of gas at the second electrode.

16. A dispenser as claimed in claim 13 wherein the fluid is the electrolyte.

17. A dispenser as claimed in claim 2 wherein electrolyte is a protonic exchange membrane having a solid polymer in which protons are mobile.

18. A dispenser as claimed in claim 2 wherein the fuel cell is selected from an alkaline electrolyte fuel cell and an acid electrolyte fuel cell.

19. A dispenser as claimed in claim 13 wherein
    the fluid comprises an alcohol compound which comprises the fuel for the cell,
    the alcohol compound is selected from methyl alcohol, ethyl alcohol, propyl alcohol, isopropyl alcohol, butyl alcohol, isobutyl alcohol, sec-butyl alcohol, tert-butyl alcohol, 1-pentanol, 1-hexanol, ethylene glycol, propylene glycol, glycerol and benzyl alcohol,
    the alcohol compound is present in at least 20% by volume of the fluid.

* * * * *